United States Patent
Naumovitz

(10) Patent No.: US 11,388,893 B2
(45) Date of Patent: Jul. 19, 2022

(54) PIVOTING FISHING JIG

(71) Applicant: Garrie Naumovitz, Union Dale, PA (US)

(72) Inventor: Garrie Naumovitz, Union Dale, PA (US)

(*) Notice: Subject to any disclaimer, the term of this patent is extended or adjusted under 35 U.S.C. 154(b) by 0 days.

(21) Appl. No.: 17/241,201

(22) Filed: Apr. 27, 2021

(65) Prior Publication Data

US 2021/0329896 A1 Oct. 28, 2021

Related U.S. Application Data

(60) Provisional application No. 63/015,986, filed on Apr. 27, 2020.

(51) Int. Cl.
*A01K 85/00* (2006.01)
*A01K 85/14* (2006.01)
*A01K 85/18* (2006.01)
*A01K 83/00* (2006.01)
*A01K 91/04* (2006.01)
*A01K 95/00* (2006.01)

(52) U.S. Cl.
CPC .............. *A01K 85/00* (2013.01); *A01K 85/14* (2013.01); *A01K 85/18* (2013.01); *A01K 83/00* (2013.01); *A01K 91/04* (2013.01); *A01K 95/00* (2013.01)

(58) Field of Classification Search
CPC ........ A01K 85/00; A01K 85/14; A01K 85/16; A01K 85/18
USPC ........... 43/42.02, 42.03, 42.04, 42.11, 42.15, 43/42.39, 42.44, 42.5
See application file for complete search history.

(56) References Cited

U.S. PATENT DOCUMENTS

| | | | | |
|---|---|---|---|---|
| 2,613,469 A | * | 10/1952 | Haberkorn | A01K 85/02 43/35 |
| 2,643,479 A | * | 6/1953 | Stevenson | A01K 83/02 43/36 |
| 2,680,927 A | * | 6/1954 | Napier | A01K 85/16 43/42.22 |
| 2,727,329 A | * | 12/1955 | Robinson | A01K 85/16 43/35 |
| 2,775,839 A | | 1/1957 | Kuslich | |

(Continued)

FOREIGN PATENT DOCUMENTS

| | | | | |
|---|---|---|---|---|
| CA | 2821432 A1 | * | 1/2014 | ............. A01K 85/14 |
| JP | 2016150003 A | * | 8/2016 | |
| JP | 2019103429 A | * | 6/2019 | |

*Primary Examiner* — Darren W Ark
*Assistant Examiner* — Katelyn T Truong
(74) *Attorney, Agent, or Firm* — Boudwin Intellectual Property; Daniel Boudwin

(57) ABSTRACT

A pivoting fishing jig is provided. The device includes a jig body having an upper section and a lower section, wherein the upper section is pivotally affixed to the lower section at a first end of each of the upper section and the lower section. The jig body is selectively movable between an open position and a closed position. A first hook is affixed to a second end of the upper section. A connector is affixed to the first end of the lower section, wherein the connector is removably securable to a fishing line. In some embodiments, a notch is disposed along an interior surface of the lower section, wherein the notch is dimensioned to receive an interior edge of the upper section therein when the jig body is in the closed position.

20 Claims, 4 Drawing Sheets

(56) References Cited

U.S. PATENT DOCUMENTS

| | | | | |
|---|---|---|---|---|
| 3,163,956 | A * | 1/1965 | Krutsch | A01K 85/16 43/35 |
| 3,241,261 | A * | 3/1966 | Ament | A01K 85/14 43/42.03 |
| 4,596,086 | A * | 6/1986 | Garland | A01K 85/00 43/42.4 |
| 4,894,945 | A * | 1/1990 | Perrine | A01K 85/14 43/42.5 |
| 5,003,723 | A * | 4/1991 | Dutcher | A01K 85/14 43/42.13 |
| 5,806,234 | A * | 9/1998 | Nichols | A01K 85/00 43/42.37 |
| 6,862,836 | B1 | 3/2005 | Ridings | |
| 9,265,239 | B2 | 2/2016 | Ford | |
| 10,327,428 | B2 | 6/2019 | Shirakawa | |
| 2010/0126058 | A1 | 5/2010 | Hughes | |
| 2020/0128804 | A1* | 4/2020 | Fox | A01K 85/00 |

* cited by examiner

PIVOTING FISHING JIG

CROSS REFERENCE TO RELATED APPLICATIONS

This application claims the benefit of U.S. Provisional Application No. 63/015,986 filed on Apr. 27, 2020. The above identified patent application is herein incorporated by reference in its entirety to provide continuity of disclosure.

BACKGROUND OF THE INVENTION

The present invention relates to fishing jigs. More particularly, the present invention pertains to a pivoting fishing jig having two pivotally affixed portions that open and close as the jig is maneuvered through the water to mimic the appearance and movement of an injured fish.

Many individuals use jigs or lures when fishing to attract fish to a baited hook. Typical jigs and lures are a unitary construction with minimal moving parts, and those that do include moving parts are unable to properly mimic the movement of a desirable bait fish. Particularly, existing jigs are unable to pivot between an open and closed position as they travel through the water to mimic wounded fish that may be more desirable for various predator fish. Additionally, as most lures and jigs are a single piece, they are capable of only attracting and securing a single fish at a time, which can limit the frequency of catches over the course of a fishing trip. Therefore, a jig that can move in a way that mimics a desirable bait fish, particularly a wounded bait fish, while also attracting fish from above and below due to the distinct moving parts is desired.

In light of the devices disclosed in the known art, it is submitted that the present invention substantially diverges in design elements from the known art and consequently it is clear that there is a need in the art for an improvement to existing fishing jigs. In this regard, the instant invention substantially fulfills these needs.

SUMMARY OF THE INVENTION

In view of the foregoing disadvantages inherent in the known types of fishing jigs now present in the known art, the present invention provides a pivoting fishing jig wherein the same can be utilized for providing convenience for the user when attracting predator fish via a baited jig that mimics the appearance and movement of an injured fish.

The present system comprises a jig body having an upper section and a lower section, wherein the upper section is pivotally affixed to the lower section at a first end of each of the upper section and the lower section, such that the jig body is selectively movable between an open position and a closed position. A first hook is affixed to a second end of the upper section. A connector is affixed to the first end of the lower section, wherein the connector is removably securable to a fishing line. In some embodiments, a notch is disposed along an interior surface of the lower section, wherein the notch is dimensioned to receive an interior edge of the upper section therein when the jig body is in the closed position.

In some embodiments, the upper section includes a transverse aperture dimensioned to receive a pin therethrough, the pin extending through each of the lower section and the upper section to pivotally secure the upper section to the lower section. In another embodiment, the upper section and the lower section are planar members disposed perpendicularly relative to each other. In other embodiments, a width of each of the upper section and the lower section tapers from a second end to the first end, such that a width of the first end is less than that of the second end. In yet another embodiment, a second hook is affixed to a second end of the lower section. In some embodiments, the first hook is smaller than the second hook. In another embodiment, the lower section comprises a material having a greater density than that of the upper section. In other embodiments, a weighted element is disposed within the lower section. In yet another embodiment, a protrusion extends from the first end of the upper section, wherein the protrusion is dimensioned to contact the lower section when the jig body is in the open position, such that the protrusion limits the angle of the upper section relative to the lower section. In some embodiments, an ornament is disposed on a first end of the upper section, wherein the ornament is configured to mimic the appearance of an eye.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
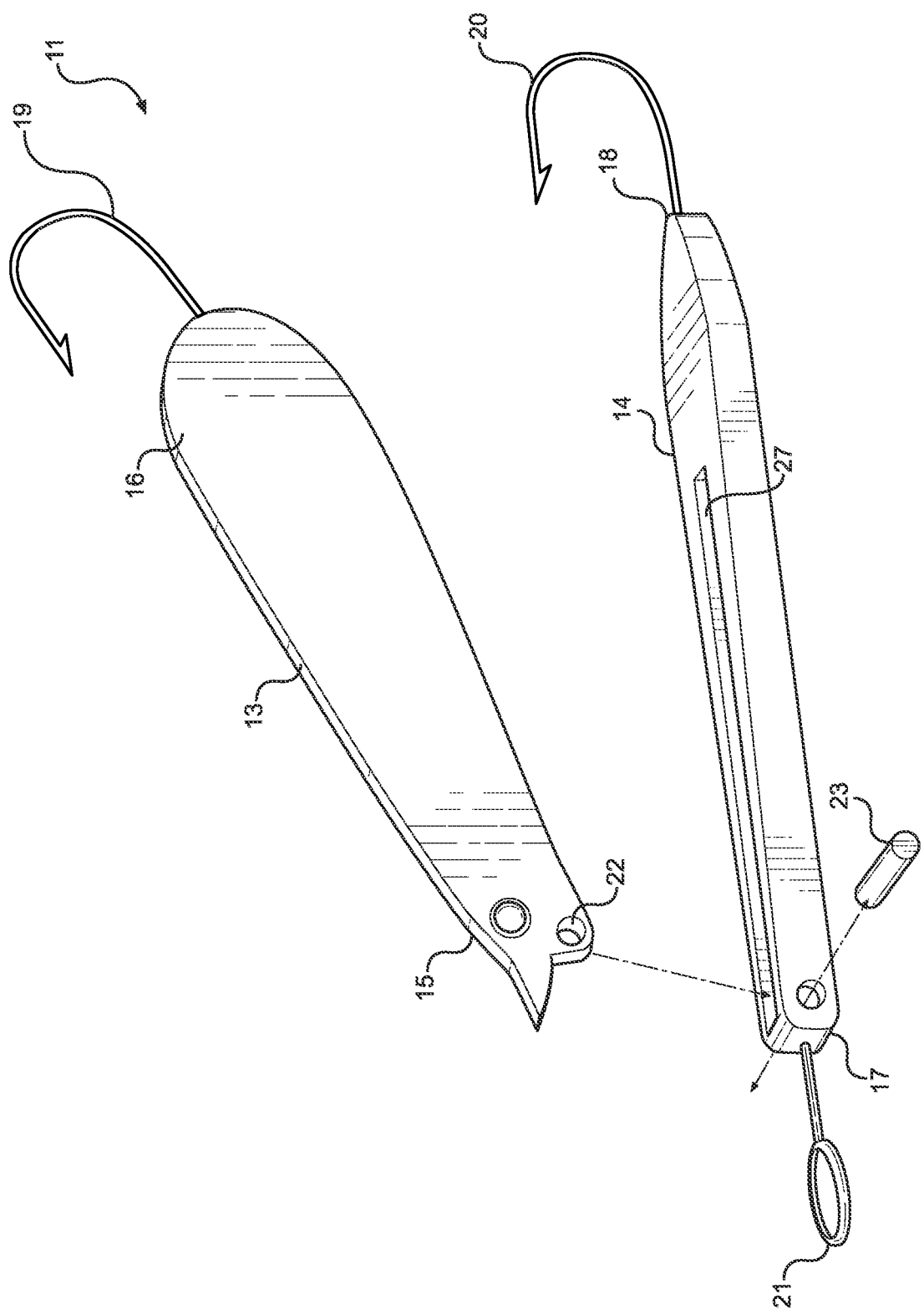
FIG. 1 shows an exploded view of an embodiment of the pivoting fishing jig.

Reference is made herein to the attached drawings. Like reference numerals are used throughout the drawings to depict like or similar elements of the pivoting fishing jig. The figures are intended for representative purposes only and should not be considered to be limiting in any respect.

Figure 2A:
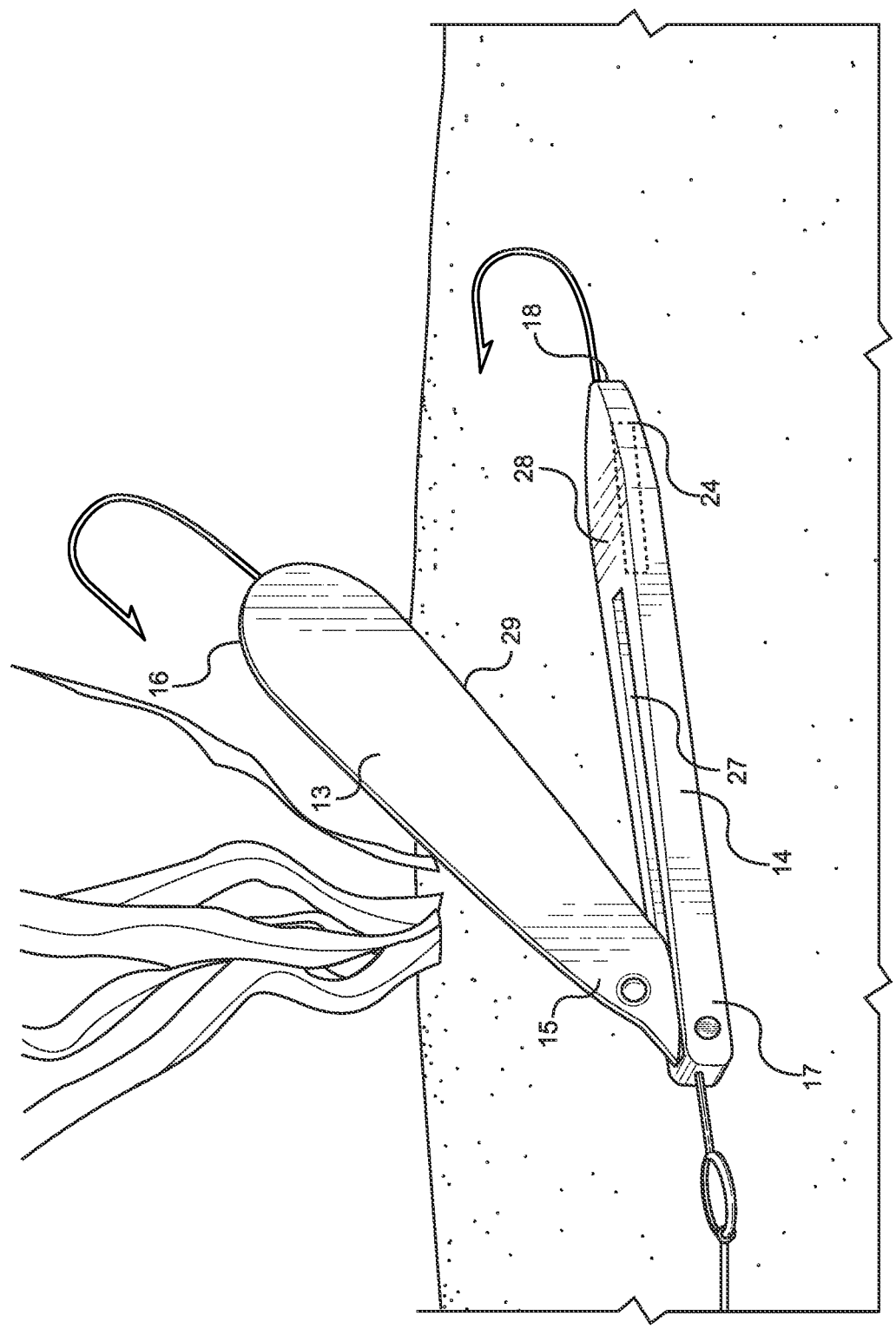
FIG. 2A shows a perspective view of an embodiment of the pivoting fishing jig in an open position.
Figure 2B:
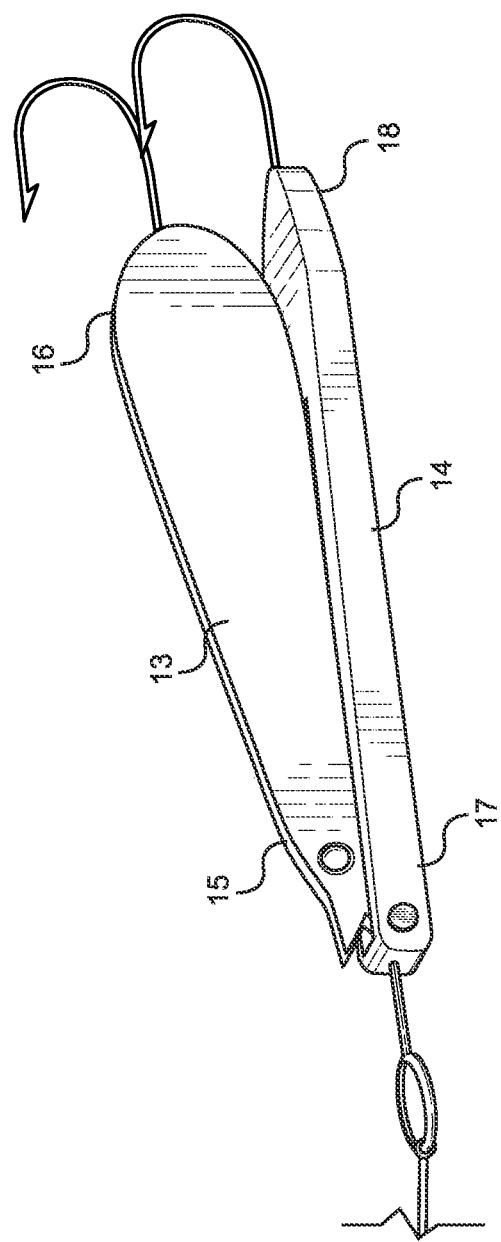
FIG. 2B shows a perspective view of an embodiment of the pivoting fishing jig in a closed position.

Referring now to FIG. 1, there is shown an exploded view of an embodiment of the pivoting fishing jig. The pivoting fishing jig 11 comprises a jig body having an upper section 13 pivotally affixed to a lower section 14. In the illustrated embodiment, the upper section 13 tapers from a second end 16 towards a first end 15 thereof, such that the first end 15 comprises a width less than that of the second end 16. Similarly, in the shown embodiment, the lower section 14 tapers from a second end 18 towards a first end 17 thereof, such that the second end 18 comprises a width greater than that of the first end 17. In this manner, the upper and lower sections 13, 14 are dimensioned to replicate the general shape of a fish or other bait animal, wherein a head of the fish comprises a smaller width than an opposing end thereof. In the illustrated embodiment, the upper and lower sections 13, 14 are affixed at each first end 15, 17 thereof, such that a distance between each second end 16, 18 of the jig body varies as the jig body pivots between an open position (as shown in FIG. 2A) and a closed position (as shown in FIG. 2B). In this manner, the jig body mimics a thrashing movement pattern similar to a wounded fish as the jig body travels through the water, thereby attracting predator fish. In the shown embodiment, the pivotal connection between the upper section 13 and the lower section 14 is formed via a pin 23 inserted through the first end 17 of the lower section 14 and a transverse aperture 22 disposed through the first end 15 of the upper section 13. Similarly, in order to facilitate this connection, a notch 27 is disposed along the lower section 14 through which the first end 15 of the upper section 13 is inserted to align the transverse aperture 22 with the pin 23.

In the illustrated embodiment, a first hook 19 is disposed on the second end 16 of the upper section 13. The first hook 19 is contemplated to comprise a variety of fishing hook styles to facilitate capture of a desired fish, including hooks having one or more rearwardly projecting barbs on a distal end thereof. Similarly, in the shown embodiment, a second hook 20 is affixed to the second end 18 of the lower section 14. The second hook 20 is contemplated to comprise a similar structure as the first hook 19, however, in some embodiments, the first and second hooks 19, 20 comprise differing sizes and styles to facilitate capture of two distinct types of fish. In the shown embodiment, each of the first and second hooks 19, 20 are oriented in the same direction, such that the first and second hooks 19, 20 are disposed in a coplanar relationship. Additionally, the combination of the first and second hooks 19, 20 allows two separate baits to be applied to the fishing jig, such that the user can attract multiple fish to the fishing jig, such as by applying differing types of bait attractive to distinct fish species. Particularly, as the jig body travels through water, the lower section 14 is contemplated to travel adjacent to a bed of the body of water, while the upper section 13 extends away from the bed. As such, the second hook 20 can be formatted to aid in the catching of bottom feeding fish, while the first hook 19 can be formatted to retain other varieties of fish. A connector 21 is disposed on the first end 17 of the lower section 14, wherein the connector 21 is configured to removably secure a fishing line thereto. In the shown embodiment, the connector 21 comprises an eyelet having an opening configured to receive a fishing line therethrough, such that the fishing line can be secured about the connector 21.

Referring now to FIGS. 2A and 2B, there is shown a perspective view of an embodiment of the pivoting fishing jig in an open position and a perspective view of an embodiment of the pivoting fishing jig in a closed position, respectively. In the illustrated embodiment, each of the upper and lower sections 13, 14 comprise substantially planar members oriented perpendicularly relative to each other. In this manner, the silhouette of the jig body mimics the general shape of a bait fish when the jig body is in each of the open and closed positions. The upper and lower sections 13, 14 are further contemplated to be dimensioned to mimic a variety of common bait animals, such as mackerel, crayfish, worms, minnows, or the like. In order to further mimic the appearance of a bait fish, in some embodiments, an exterior surface of each of the upper and lower sections 13, 14 comprises indicia thereon to replicate the scale pattern or other visual appearance of a bait fish. In another embodiment, an exterior surface of each of the upper and lower sections 13, 14 comprises a reflective material, such as a silvered exterior, such that light reflected from the jig body increases visual appeal to attract fish to the jig. In other embodiment, embellishments are affixed to each of the upper and lower sections 13, 14, wherein the embellishments represent claws, tails, or other features of the mimicked bait fish. In some embodiments, the lower section 14 comprises a concave shape such that the surface area of the lower section 14 is increased relative to the upper section 13, thereby slowing the movement of the jig body through the water, whereas the planar lower section 14 allows the fishing jig to cut through the water more easily, increasing the rate of movement. In this manner, variants of the fishing jig can be utilized to mimic the rate of movement of various bait fish to increase verisimilitude to attract other fish that prey on the mimicked bait fish. In some embodiments, a weight of the upper section 13 is less than a weight of the lower section 14, such that the lower section 14 is more stable in the water to facilitate movement of the upper section 13 relative to the lower section 14. In this manner, the irregular movement of the pivoting fishing jig traveling through the water as the user intermittently reels in the fishing line causes the upper section 13 to selectively move between the open position and the closed position relative to the relatively stationary lower section 14, thereby mimicking the movement of a wounded bait fish. In some embodiments, the upper section 13 comprises a material having a density less than that of the lower section 14, such that the weight of the upper section 13 is less than that of the lower section 14. Alternatively, in another embodiment, a weighted member 24 is disposed within the lower section 14. In the illustrated embodiment, the weighted member 24 is disposed internally adjacent to the second end 18, such that the weighted member 24 can extend across a width of the lower section 14 to evenly distribute the weight of the weighted member 24. Furthermore, as previously described, the first hook can comprise a smaller hook than that of the second hook, such that the differing hooks lead to a difference in weight between the upper and lower sections 13, 14.

In the illustrated embodiment, the notch 27 extends through the lower section 14, wherein the notch 27 is dimensioned to receive a lower edge 29 of the upper section 13 therein. In some embodiments, the notch 27 extends between an interior surface 28 of the lower section 14 and an exterior surface of the lower section 14, such that the notch 27 defines a linear opening through the lower section 14. In alternate embodiments, the notch 27 comprises a depression extending partially into the interior surface 28 such that water cannot pass through the notch 27 during travel. In this manner, the movement of the upper section 13 is not impeded by water pressure passing through the notch 27, thereby allowing the interior edge 29 to rest flush within the notch 27. In the shown embodiment, the notch 27 extends partially along a length of the lower section 14, such that a portion of the interior edge 29 is received therein. In this manner, the second end 16 of the upper section 13 is maintained in a partially elevated position when the jig body is in the closed position. As such, as the jig body pivots about the first ends 15, 17 of each of the upper and lower sections 16, 18, the distance between the second ends 16, 18 varies to mimic the motion of a wounded bait fish.

Figure 3:
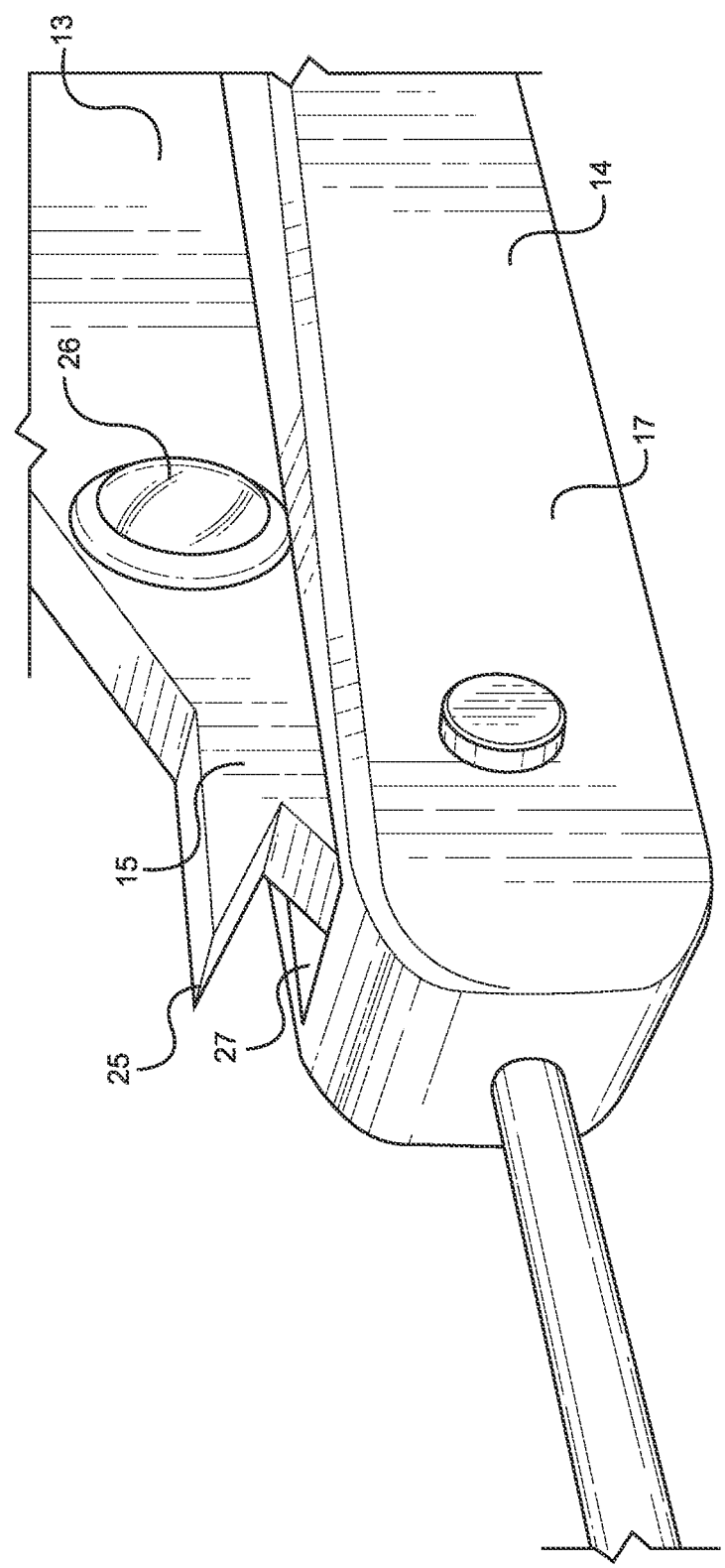
FIG. 3 shows a close-up view of the hinge of an embodiment of the pivoting fishing jig.

Referring now to FIG. 3, there is shown a close-up view of the hinge of an embodiment of the pivoting fishing jig. In the illustrated embodiment, the first ends 15, 17 of each of the upper and lower sections 13, 14 are pivotally affixed via a pin to define a hinge. The pin extends through the aperture of the upper section 13 as previously described herein. In the shown embodiment, a protrusion 25 extends from the first end 15 of the upper section 13, wherein the protrusion 25 serves to limit the range of movement of the upper section 13 about the hinge. As such, when the upper section 13 is in the open position, the protrusion 25 rests flush against an upper surface of the first end 17 of the lower section 14 to prevent the upper section 13 from extending beyond a desired angle. In some embodiments, the protrusion 25 is dimensioned to limit the angle between the upper and lower sections 25 when in the open position to 45-degrees. In this manner, the upper section 13 cannot overextend in such a way as to prevent the movement of the upper section 13 to the closed position upon movement of the jig body due to reeling in the associated fishing line, thereby ensuring continued operation of the pivoting fishing jig to replicate the desired baiting effect. Furthermore, in the illustrated embodiment, the upper section 13 further comprises an ornament 26 thereon, wherein the ornament 25 replicates a feature of a bait fish to visually mimic a bait fish more accurately. In the shown embodiment, the ornament 25 comprises an eye disposed on opposing sides of the upper section 13 adjacent to the first end 15 thereof. Alternate ornaments 25 are contemplated, including extensions replicating fins or other features of common bait fish.

In one use, the user can affix the jig body to a fishing line via the connector, wherein the fishing line can be tied through an opening disposed through an eyelet. The first and second hooks can then be baited to lure fish towards the pivoting fishing jig. During operation, the user can intermittently reel in the fishing line to gradually move the fishing jig through the water in an irregular pattern to selectively move the upper section 13 and the lower section 14 between the open position and the closed position. Such movement can further attract predator fish drawn to potentially wounded prey. In this manner, the user can more efficiently attract a variety of fish to the fishing jig to be caught.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pivoting fishing jig, comprising:
a jig body having an upper section and a lower section;
wherein the upper section is pivotally affixed to the lower section at a first end of each of the upper section and the lower section such that the jig body is selectively movable between an open position and a closed position;
wherein the upper section extends along a longitudinal axis of the lower section adjacent to an upper surface of the lower section;
a notch disposed along an interior surface of the lower section, wherein the notch is dimensioned to receive an interior edge of the upper section therein when the jig body is in the closed position;
wherein the notch is defined by a pair of opposing closed ends;
a triangular protrusion extending from the first end of the upper section, wherein the triangular protrusion is disposed coplanar to the upper section;
wherein a lower surface of the triangular protrusion is dimensioned to rest flush against the lower section exterior to the notch adjacent to one of the pair of opposing closed ends when the jig body is in the open position, such that the triangular protrusion limits an angle of the upper section relative to the lower section in the open position to an acute angle;
a first hook affixed to a second end of the upper section;
a connector affixed to the first end of the lower section, wherein the connector is removably securable to a fishing line.

2. The pivoting fishing jig of claim 1, wherein the upper section includes a transverse aperture disposed through a rounded lower portion of the first end of the upper section, the transverse aperture dimensioned to receive a pin therethrough, the pin extending through each of the lower section and the upper section to pivotally secure the upper section to the lower section.

3. The pivoting fishing jig of claim 1, wherein the upper section and the lower section are planar members disposed perpendicularly relative to each other.

4. The pivoting fishing jig of claim 1, wherein a width of each of the upper section and the lower section tapers from a second end to the first end, such that a width of the first end is less than that of the second end.

5. The pivoting fishing jig of claim 1, further comprising a second hook affixed to a second end of the lower section.

6. The pivoting fishing jig of claim 5, wherein the first hook is smaller than the second hook.

7. The pivoting fishing jig of claim 1, wherein the lower section comprises a material having a greater density than that of the upper section.

8. The pivoting fishing jig of claim 1, further comprising a weighted element disposed within the lower section.

9. The pivoting fishing jig of claim 1, further comprising an ornament on the first end of the upper section, wherein the ornament is configured to mimic the appearance of an eye.

10. A pivoting fishing jig, comprising:
a jig body having an upper section and a lower section;
wherein the upper section is pivotally affixed to the lower section at a first end of each of the upper section and the lower section such that the jig body is selectively movable between an open position and a closed position;
a notch disposed along an interior surface of the lower section, wherein the notch is dimensioned to receive an interior edge of the upper section therein when the jig body is in the closed position;
wherein the notch is defined by sidewalls disposed perpendicular to an upper surface of the lower section and a pair of opposing closed ends, such that the notch is disposed entirely within a perimeter of the lower section;
a triangular protrusion extending from the first end of the upper section in alignment with the notch, wherein the triangular protrusion is disposed coplanar to the upper section;
wherein a lower surface of the triangular protrusion is dimensioned to rest flush against the lower section exterior to the notch adjacent to one of the pair of opposing closed ends when the jig body is in the open position, such that the triangular protrusion limits an angle of the upper section relative to the lower section in the open position to an acute angle;
a first hook affixed to a second end of the upper section;
a connector affixed to the first end of the lower section, wherein the connector is removably securable to a fishing line.

11. The pivoting fishing jig of claim 10, wherein the upper section includes a transverse aperture disposed through a rounded lower portion of the first end of the upper section, the transverse aperture dimensioned to receive a pin therethrough, the pin extending through each of the lower section and the upper section to pivotally secure the upper section to the lower section.

12. The pivoting fishing jig of claim 10, wherein the upper section and the lower section are planar members disposed perpendicularly relative to each other.

13. The pivoting fishing jig of claim 10, wherein a width of each of the upper section and the lower section tapers from a second end to the first end, such that a width of the first end is less than that of the second end.

14. The pivoting fishing jig of claim 10, further comprising a second hook affixed to a second end of the lower section.

15. The pivoting fishing jig of claim 14, wherein the first hook is smaller than the second hook.

16. The pivoting fishing jig of claim 10, wherein the lower section comprises a material having a greater density than that of the upper section.

17. The pivoting fishing jig of claim 10, further comprising a weighted element disposed within the lower section.

18. The pivoting fishing jig of claim 10, wherein the notch comprises a linear opening extending entirely through the lower section.

19. The pivoting fishing jig of claim 11, wherein the pin extends through the notch, such that the rounded lower portion of the front end of the upper section is disposed within the notch to align the transverse aperture with the pin.

20. A pivoting fishing jig, consisting of:
a jig body having an upper section and a lower section;
wherein the upper section is pivotally affixed to the lower section at a first end of each of the upper section and the lower section such that the jig body is selectively movable between an open position and a closed position;
a notch disposed along an interior surface of the lower section, wherein the notch is dimensioned to receive an interior edge of the upper section therein when the jig body is in the closed position;
wherein the notch is defined by sidewalls disposed perpendicular to an upper surface of the lower section and a pair of opposing closed ends, such that the notch is disposed entirely within a perimeter of the lower section;
a triangular protrusion extending from the first end of the upper section in alignment with the notch, wherein the triangular protrusion is disposed coplanar to the upper section;
wherein a lower surface of the triangular protrusion is dimensioned to rest flush against the lower section exterior to the notch adjacent to one of the pair of opposing closed ends when the jig body is in the open position, such that the triangular protrusion limits an angle of the upper section relative to the lower section in the open position to an acute angle;
wherein the upper section includes a transverse aperture disposed through a rounded lower portion of the first end of the upper section, the transverse aperture dimensioned to receive a pin therethrough;
wherein the pin extends through each of the lower section and the upper section to pivotally secure the upper section to the lower section;
a first hook affixed to a second end of the upper section;
a connector affixed to the first end of the lower section, wherein the connector is removably securable to a fishing line.

* * * * *